United States Patent
Herle et al.

(10) Patent No.: US 8,037,418 B2
(45) Date of Patent: Oct. 11, 2011

(54) SYSTEM AND METHOD FOR ENSURING INTEGRITY OF DATA-DRIVEN USER INTERFACE OF A WIRELESS MOBILE STATION

(75) Inventors: Sudhindra P. Herle, Plano, TX (US); Mark Mitchell, Dallas, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1387 days.

(21) Appl. No.: 10/035,800

(22) Filed: Dec. 28, 2001
(Under 37 CFR 1.47)

(65) Prior Publication Data
US 2002/0101459 A1    Aug. 1, 2002

Related U.S. Application Data

(63) Continuation-in-part of application No. 09/551,112, filed on Apr. 18, 2000.

(51) Int. Cl.
*G06F 3/00*    (2006.01)
(52) U.S. Cl. ........ 715/765; 715/744; 715/764; 715/761; 715/762
(58) Field of Classification Search .................. 715/744, 715/746, 761, 762
See application file for complete search history.

(56) References Cited

U.S. PATENT DOCUMENTS

| | | | | |
|---|---|---|---|---|
| 6,014,669 A | * | 1/2000 | Slaughter et al. | 707/10 |
| 6,031,533 A | * | 2/2000 | Peddada et al. | 715/733 |
| 6,046,740 A | * | 4/2000 | LaRoche et al. | 715/764 |
| 6,286,001 B1 | * | 9/2001 | Walker et al. | 707/9 |
| 6,324,693 B1 | * | 11/2001 | Brodersen et al. | 717/177 |
| 6,466,937 B1 | * | 10/2002 | Fascenda | 707/10 |
| 6,509,913 B2 | * | 1/2003 | Martin et al. | 715/762 |
| 6,544,295 B1 | * | 4/2003 | Bodnar | 709/219 |
| 6,633,315 B1 | * | 10/2003 | Sobeski et al. | 715/762 |
| 6,738,932 B1 | * | 5/2004 | Price | 714/38 |
| 2002/0042870 A1 | * | 4/2002 | Rocray et al. | 712/10 |
| 2004/0039993 A1 | * | 2/2004 | Kougiouris et al. | 715/513 |

* cited by examiner

*Primary Examiner* — Ryan Pitaro

(57) ABSTRACT

A wireless communication device stores a system GUI configuration file and a downloaded service provider GUI configuration file, each of which contains a text name checksum value that is calculated using the text names of the GUI parameter data stored either the system GUI configuration file or the service provider GUI configuration file. The text name checksum values are based on the text names of the GUI parameter data. After the download operation is complete, a text name checksum comparator program compares the downloaded text name checksum value to the initial text name checksum value in the system GUI configuration file. If the two text name checksum values do not match, the downloaded service provider GUI configuration file is rejected.

20 Claims, 7 Drawing Sheets ers, by the regional Bell companies, and by the national long # SYSTEM AND METHOD FOR ENSURING INTEGRITY OF DATA-DRIVEN USER INTERFACE OF A WIRELESS MOBILE STATION This application is a continuation-in-part of U.S. patent application Ser. No. 09/551,112, filed Apr. 18, 2000, entitled "System and Method for Modifying a Wireless Mobile Station User Interface."

CROSS-REFERENCE TO RELATED APPLICATION

The present invention is related to the invention disclosed in U.S. patent application Ser. No. 09/551,112, filed Apr. 18, 2000, entitled "SYSTEM AND METHOD FOR MODIFYING A WIRELESS MOBILE STATION USER INTERFACE." Application Ser. No. 09/551,112 is commonly assigned to the assignee of the present invention. The disclosure of the related patent application is hereby incorporated by reference for all purposes as if fully set forth herein.

TECHNICAL FIELD OF THE INVENTION

The present invention is directed, in general, to wireless communication devices and, more specifically, to a system and method for ensuring the integrity of a data driven user interface.

BACKGROUND OF THE INVENTION

There are several hundred million wireless/cellular telephone customers in the world today. Within the United States, wireless/cellular service is offered by cellular service providers, by the regional Bell companies, and by the national long distance operators. The enhanced competition has driven the price of wireless service down to the point where it is affordable to a large segment of the population.

Many wireless service providers offer their customers a selection of wireless telephone handsets from different wireless telephone manufacturers. However, the wireless service providers generally also try to establish a particular look-and-feel for their wireless telephone handsets. To accomplish this, a wireless service provider may require different handset manufacturers to customize the graphical user interface (GUI) of the handsets used by the service provider's customers, so that all handsets, even ones from different manufacturers, present the customers with the same or very similar screen menus, program message strings, icons, audible sounds, and manner of operation. Thus, a cell phone used by one AT&T® customer generally has the same look-and-feel as a cell phone used by another AT&T® customer, even though one cell phone may be manufactured by NOKIA® and the other cell phone may be manufactured by SAMSUNG®. The same can be said about the cell phones used by customers of SPRINT®, PRIMECO®, and others.

However, whenever a new handset is manufactured or customized for a different wireless service provider, or a new feature is added to an existing handset, a wireless handset manufacturer must expend significant resources to modify, compile, and test the operating system software that controls the wireless telephone handset. Often, this cycle of modify-compile-test must be repeated several times before an acceptable quality and look-and-feel is achieved. The entire process is costly and time consuming and requires close cooperation between the wireless handset manufacturer and the wireless service provider that specifies the changes that it wants made to the GUI for its customer cell phones.

U.S. patent application Ser. No. 09/551,112 incorporated by reference above discloses a wireless communication device in which the functions of the basic operating system and the graphical user interface (GUI) are partitioned. The basic operating system operates the GUI by retrieving data defining the GUI from a GUI configuration file. The GUI may be readily modified by editing the definitional data in the GUI configuration file.

When the GUI parameters (i.e., menus, program strings, bitmaps, icons, animations, audio data files, etc.) are loaded into the handset, the handset must be able to determine if the data being downloaded is compatible with the current software on the handset. Each piece of GUI parameter data (e.g., menu entry, program strings, bitmaps, icons, animations, and the like) is identified by a unique human readable textual name. This textual name is unsuitable for processing by the handset software as it is inefficient. Each textual name is therefore assigned a unique positive integer value. The integer value is used by the handset software to refer to the GUI parameter data. A resource compiler assigns the integers to the textual names.

However, when a new GUI parameter data is added, the resource compiler may assign a unique integer to the new resource. This action may change the numbering of existing items. If the resulting data is downloaded to the handset, the handset has no way of knowing that the numbering has changed. This may result in an error in the operation of the handset. Maintaining a count of GUI parameter data is inaccurate, since the handset cannot distinguish the case of deleting a GUI parameter data followed by addition of a new GUI parameter data.

Therefore, there is a need for improved wireless devices that use a graphical user interface that is simple and inexpensive to modify. In particular, there is a need for apparatuses and methods for ensuring integrity of GUI parameter data used by a data-driven user interface of a wireless mobile station.

SUMMARY OF THE INVENTION

To address the above-discussed deficiencies of the prior art, it is a primary object of the present invention to provide a wireless communication device that stores a system GUI configuration file and a downloaded service provider GUI configuration file, each of which contains a checksum value that is calculated using the text names of the GUI parameter data. After the download operation is complete, a program in the wireless communication device compares the downloaded text name checksum value to the initial text name checksum value in the system GUI configuration file. If the two text name checksum values do not match, the downloaded service provider GUI configuration file is rejected.

According to an advantageous embodiment of the present invention, the wireless communication device comprises: 1) a main controller capable of executing a basic operating system application program that operates communication functions of the wireless communication device and that controls a first graphical user interface (GUI) for interacting with a user; and 2) a memory coupled to the main controller capable of storing a first GUI configuration file and a second GUI configuration file, wherein the first GUI configuration file contains first GUI parameter data comprising a first plurality of text names associated with at least one of: sounds, graphical images, text, menu options and a menu hierarchy associated with the first graphical user interface, and the second GUI configuration file contains second GUI parameter data comprising a second plurality of text names associated with at least one of: sounds, graphical images, text, menu options and a menu hierarchy associated with a second graphical user interface. The main controller is operable to validate the second GUI parameter data by comparing a first text name checksum value associated with the first GUI configuration file with a second text name checksum value associated with the second GUI configuration file.

According to one embodiment of the present invention, the main controller replaces at least a portion of the first GUI parameter is data with the second GUI parameter data in response to a determination that the first and second text name checksum values are equal.

According to another embodiment of the present invention, the first text name checksum value is calculated from the first plurality of text names.

According to still another embodiment of the present invention, the second text name checksum value is calculated from the second plurality of text names.

According to yet another embodiment of the present invention, the first GUI configuration file is a system default GUI configuration file.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. In the embodiments described below, the mobile station is a cellular telephone handset. However, it will be appreciated by those skilled in the art that the present invention may implemented in a variety of personal communication devices, including, for example, personal digital assistant (PDA) devices, such as a handheld PALM™ electronic organizer.

Figure 1:
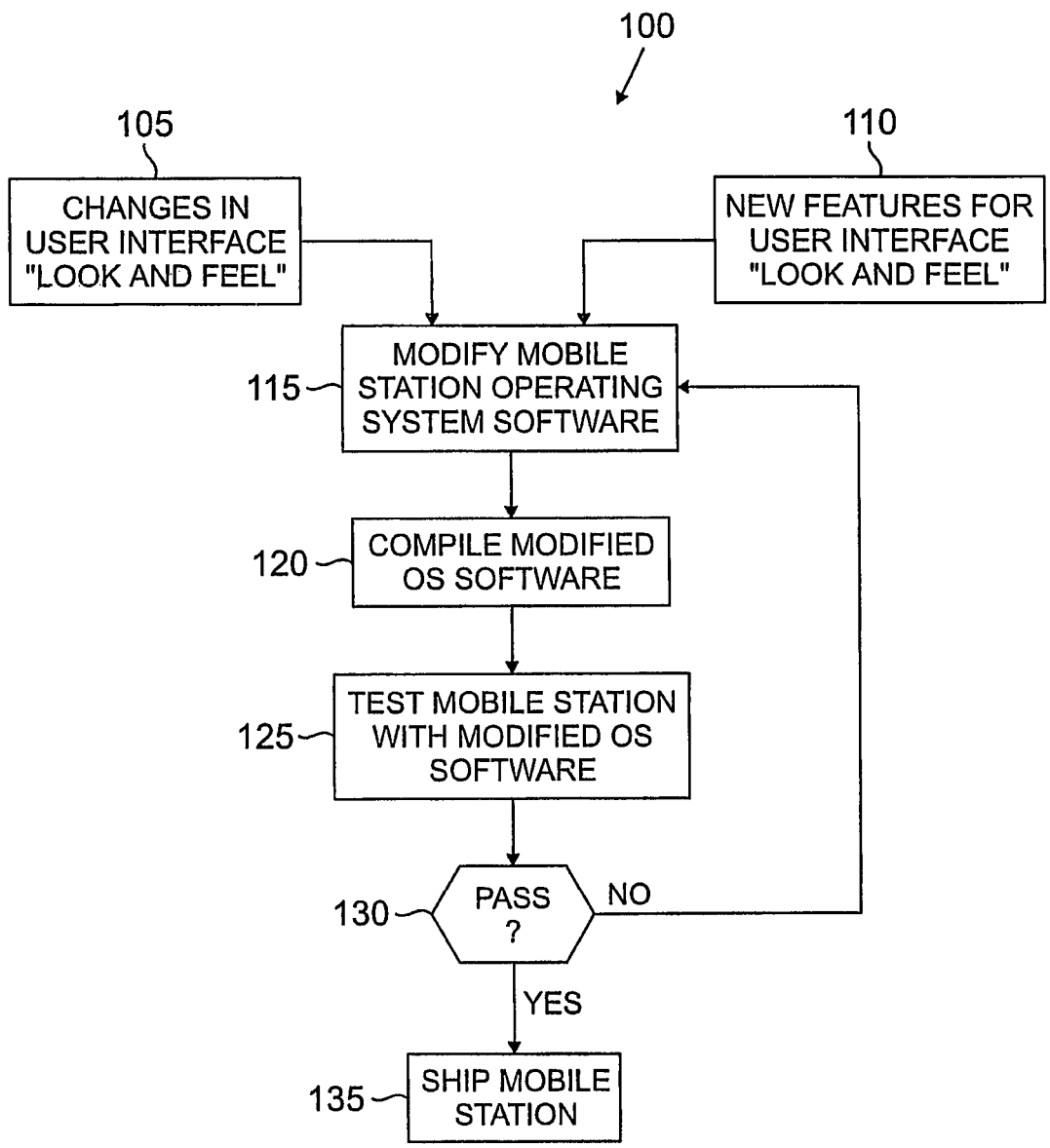
FIG. 1 is a flow diagram illustrating a prior art process for changing the user interface (i.e., the "look-and-feel") of a mobile station.

FIG. 1 depicts flow diagram 100, which illustrates a prior art process for changing the graphical user interface, or GUI (i.e., the "look-and-feel"), of a mobile station. Initially, a wireless mobile station manufacturer determines a set of changes in the existing user interface that the manufacturer wishes to make (process step 105). These changes may have been requested by, for example, a wireless service provider, such as AT&T, SPRINT, or MCI, that wants the wireless handset used by its customers to have a unique look-and-feel. Additionally, the wireless mobile station manufacturer may independently determine a set of new features that are to be added to the existing user interface (process step 110).

Next, the manufacturer modifies the existing mobile station operating system software to implement the GUI changes and new features, if any, identified in process steps 105 and 110 above (process step 115). When the proposed modifications have been made, the manufacturer compiles the modified operating system software (process step 120). The manufacturer then tests a handset that has the modified and compiled operating system software installed (process step 125). If the test handset fails, the manufacturer again modifies the mobile station operating system software (process steps 130 and 115) and repeats the compiling an testing procedures. If the test handset passes the tests, the manufacturer ships the mobile station to the service provider or to the service provider's customers (process steps 130 and 135).

The present invention simplifies and reduces the cost of the above-described process by separating the look-and-feel aspects of the graphical user interface (GUI) of a wireless telephone handset from the basic functionality of the operating system of the handset. According to the principles of the present invention, the operating system software accesses GUI configuration files containing data that describes the GUI interface menu hierarchies, screen displays, text messages, audible alerts, and the like. A system (or default) GUI configuration file is provided by the manufacturer that gives the handset a basic default look-and-feel. However, the present invention allows the handset manufacturer or the service provider to easily modify the GUI by loading into the handset, either over the air or via a wired connection, a user-defined GUI configuration file that is accessed by the operating system software and that gives the handset a customized look-and-feel. The basic functions of the operating system software are undisturbed because only a data file is modified in the handset.

Figure 2:
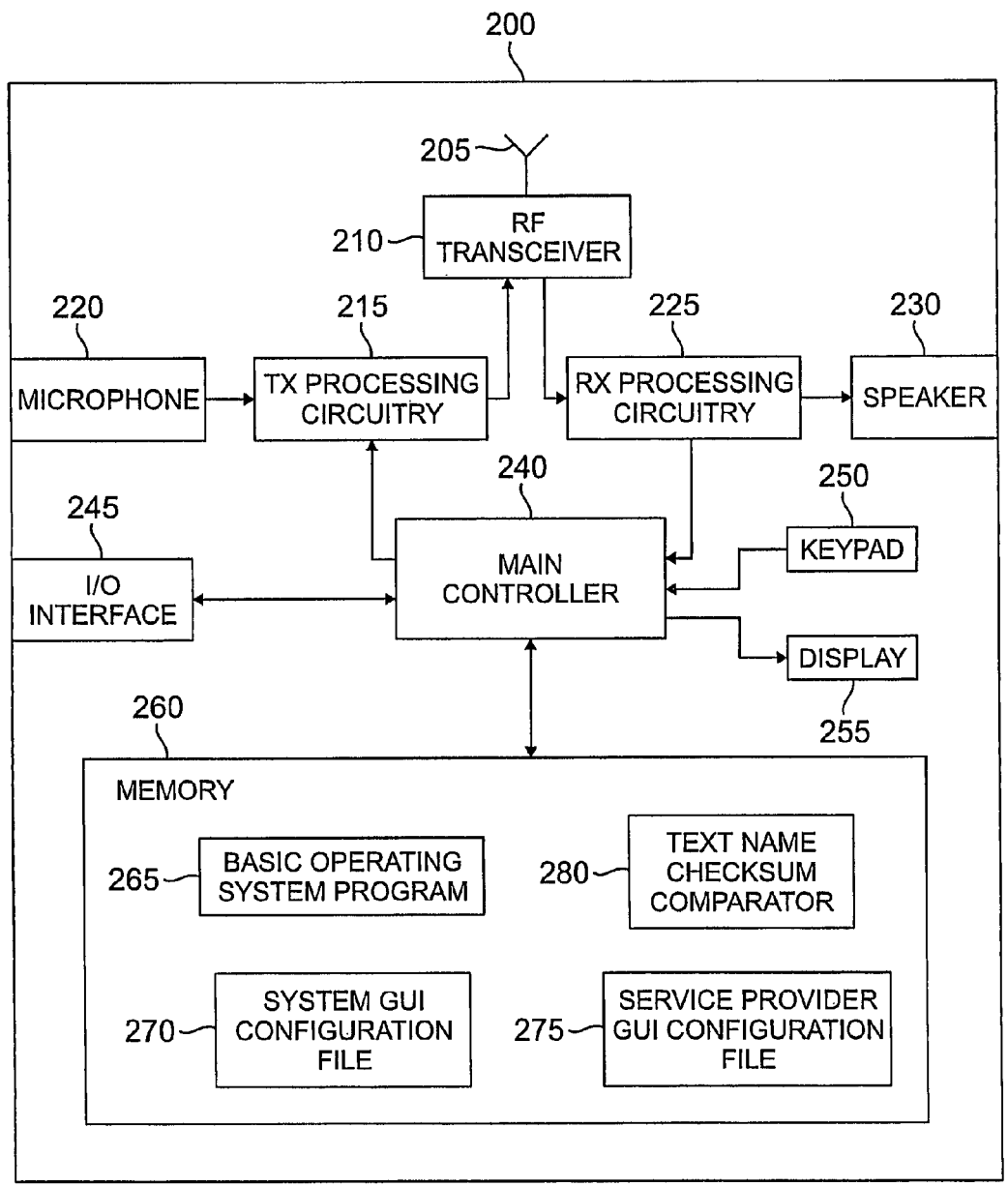
FIG. 2 illustrates an exemplary mobile station according to one embodiment of the present invention.

FIG. 2 illustrates exemplary mobile station 200 according to one embodiment of the present invention. Mobile station 200 comprises antenna 205, radio frequency (RF) transceiver 210, transmitter (TX) processing circuitry 215, microphone 220, receiver (RX) processing circuitry 225, and speaker 230. Mobile station 200 further comprises main controller 240, input/output (I/O) interface 245, keypad 250, display 255, and memory 260. Memory 260 stores basic operating system program 265, system graphical user interface (GUI) configuration file 270, service provider GUI configuration file 275, and text name checksum comparator program 280, which is executed by main controller 240.

As will be explained below in greater detail, system GUI configuration file 270 and service provider GUI configuration file 275 each contain a text name checksum value that is calculated using the text names of the GUI parameter data stored in system GUI configuration file 270 and service provider GUI configuration file 275. During the initial load of source code software and system GUI configuration file 270 onto mobile station 200, the mobile station handset manufacturer calculates an initial text name checksum value based on the text names of the GUI parameter data and stores the initial text name checksum value in system GUI configuration file 270. During a subsequent download of a new service provider GUI configuration file 275 onto mobile station 200, the service provider or mobile station handset manufacturer calculates a subsequent "downloaded" text name checksum value based on the text names of the GUI parameter data in new service provider GUI configuration file 275 and stores the downloaded text name checksum value in new service provider GUI configuration file 275. After the download operation is complete, but before accepting new service provider GUI configuration file 275, text name checksum comparator program 280 compares the downloaded text name checksum value to the initial text name checksum value in system GUI configuration file 270. If the two text name checksum values do not match, new service provider GUI configuration file 275 is rejected.

Antenna 205 transfers wireless communication signals between the wireless network and RF transceiver 210. RF transceiver 210 receives and demodulates incoming RF signals transmitted by the wireless network and transfers the demodulated voice and/or data traffic to RX processing circuitry 225. RF transceiver 210 also modulates and transmits outgoing voice and/or data traffic received from TX processing circuit 215.

TX processing circuitry 215 receives voice signals from microphone 220 and processes the voice signals prior to transmission by RF transceiver 210. TX processing circuitry 215 may also receive and process data, such as keystroke entries from keypad 250 (via main controller 240) for subsequent transmission by RF transceiver 210. RX processing circuitry 225 receives voice traffic from RF transceiver 210 and converts the voice traffic to analog signals that drive speaker 230. RX processing circuitry 225 may also transfer incoming data traffic to main controller 240.

Main controller 240 executes basic operating system program 265 in order to control the operation of TX processing circuitry 215, RX processing circuitry 225, and the other components of mobile station 200. Main controller 240 also processes incoming data from keypad 250, outgoing data for display 255, and data that is loaded from I/O interface 245. I/O interface 245 typically comprises a connector and interface circuits that connect an external data source, such as a computer, to main controller 240. I/O interface 245 allows main controller 240 to upload data, such as a new service provider GUI configuration file 275, and store it in memory 260.

Keypad 250 comprises control and alphanumeric keys allow a user to select functions, enter data, and dial numbers. The control keys on keypad 250 may be used to sequence through various menus screens that may appear on display 255. Display 255 may display a limited set of alphanumeric characters or may be capable of displaying a wide array of dynamic and/or static graphics. Display 255 is active when the handset is powered on and may normally show the service provider's logo during the time that power is turned on.

Memory 260 stores application programs and data associated with the operation of mobile station 200, including basic operating system program 265, system GUI configuration file 270, and service provider GUI configuration file 275. Basic operating system program 265 comprises software that controls the basic operation of mobile station 200, including basic functions that allow the manufacturer or the service provider to modify the look-and-feel of mobile station 200. System GUI configuration file 270 contains default data established by the handset manufacturer that provides the GUI interface with initial menu hierarchies, screen displays, text messages, audible alerts, icons, and the like. Service provider GUI configuration file 275 contains unique (or customized) data created by the wireless service provider that provides the GUI interface with customized menu hierarchies, screen displays, text messages, audible alerts, icons, and the like. The customized data in service provider GUI configuration file 275 gives the handset a look-and-feel that is unique to the wireless service provider.

Figure 3:
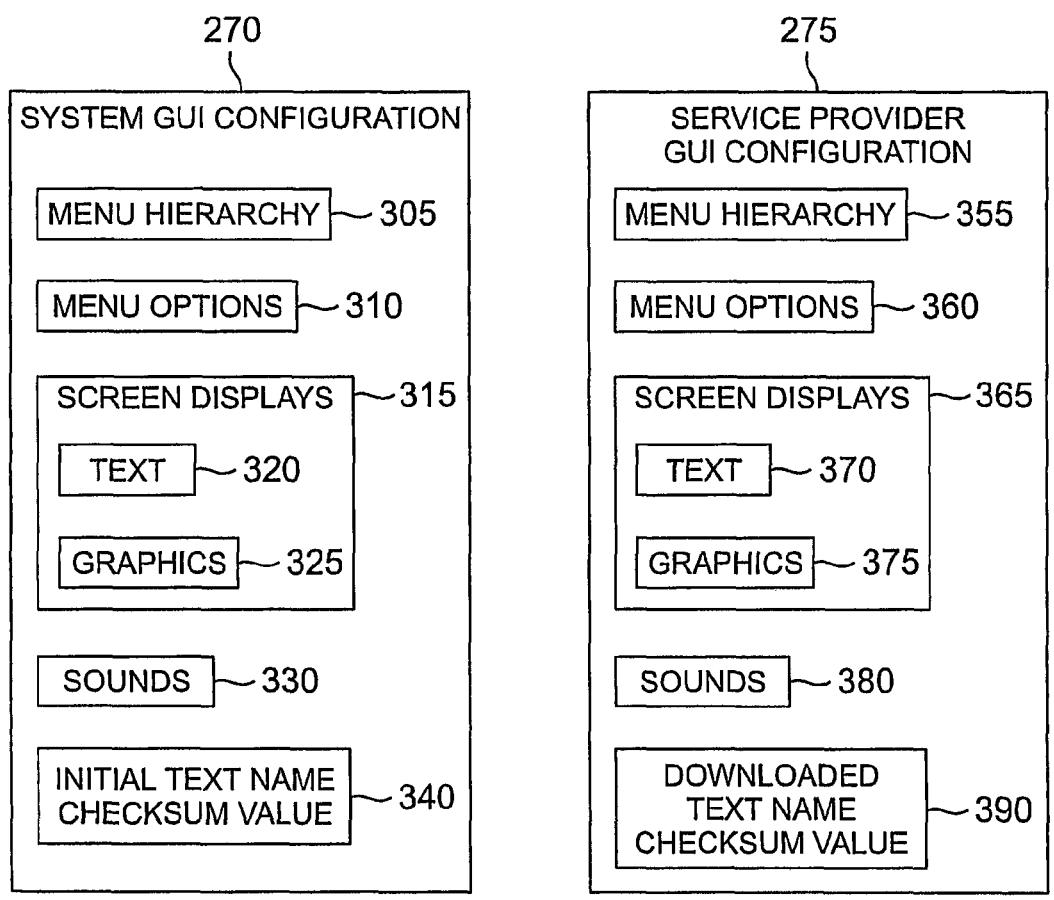
FIG. 3 illustrates an exemplary system GUI configuration file and an exemplary service provider GUI configuration file in greater detail according to one embodiment of the present invention.

FIG. 3 illustrates exemplary system GUI configuration file 270 and exemplary service provider GUI configuration file 275 in greater detail according to one embodiment of the present invention. System GUI configuration file 270 comprises menu hierarchy file 305, menu options file 310, screen displays file 315, sounds file 330, and initial text name checksum value 340. Screen displays file 315 further comprises text file 320 and graphics file 325. Service provider GUI configuration file 275 comprises menu hierarchy file 355, menu options file 360, screen displays file 365, sounds file 380, and downloaded text name checksum value 390. Screen displays file 365 further comprises text file 370 and graphics file 375.

As discussed previously, system GUI configuration file 270 stores default (i.e., manufacturer selected) look-and-feel data which may be initially entered during the manufacturing process. Menu hierarchy file 305 provides storage for the initial function sequence which is to be exercised by mobile station 200 until the sequence is changed the service provider. For instance, menu hierarchy file 305 may cause mobile station 200, upon power application, to display a default greeting screen from which the user may access subsequent default screens (using scroll and select buttons). The subsequent screens may allow the user to select, among others, a calendar function, a previous call list, a missed call list, a stored telephone number directory, an address book, and the like.

Menu options file 310 stores a default list of menu options which have been enabled or disabled by the manufacturer. For instance, menu options file 310 may provide six selectable entries in a scrolling menu that allow a user to select the number of times (i.e., 1 to 6) the handset will ring when an incoming call is received before the caller is switched to voice mail. Menu options file 310 may be set to a default value of four rings by the manufacturer. Similarly, another menu in menu options file 310 may provide five selectable entries in a scrolling menu that allow a user to select the type of sound the handset makes when it rings, including perhaps a vibrating mode. The ringing sounds may be stored in sounds file 330.

Screen displays file 315 provides the default text and graphics symbols for mobile station 200 as specified by the manufacturer. For instance, graphics file 325 may store the manufacturer's logo and text file 320 may store the word "READY" or some other greeting for display when mobile station 200 is powered on. In a similar manner, the manufacturer may selected a calendar symbol for storage in graphics file 325 and for display when the calendar feature is available or selected.

Sounds file 330 stores audio data clips, such as bells, whistles, chirps, music, and the like, that are used by basic operating system program 265 to alert the use to different events, such as an incoming call, an incoming text message, a calendar reminder, low battery power, and the like.

In a similar manner, service provider GUI configuration file 275 stores mobile station 200 features as selected and activated by the service provider. In some embodiments of the present invention, the service provider may only be allowed to enable or disable particular features at the discretion of the manufacturer of mobile station 200. Menu hierarchy file 355, menu options file 360, screen displays file 365, text file 370, graphics 375, and sounds file 380 are equivalent to the corresponding files in system GUI configuration file 270. The GUI of mobile station 200 may be customized by the wireless service provider by causing main controller 240 to use the customized phone settings stored in service provider GUI configuration file 275 in place of the manufacturer's default settings in system GUI configuration file 270.

Figure 4:
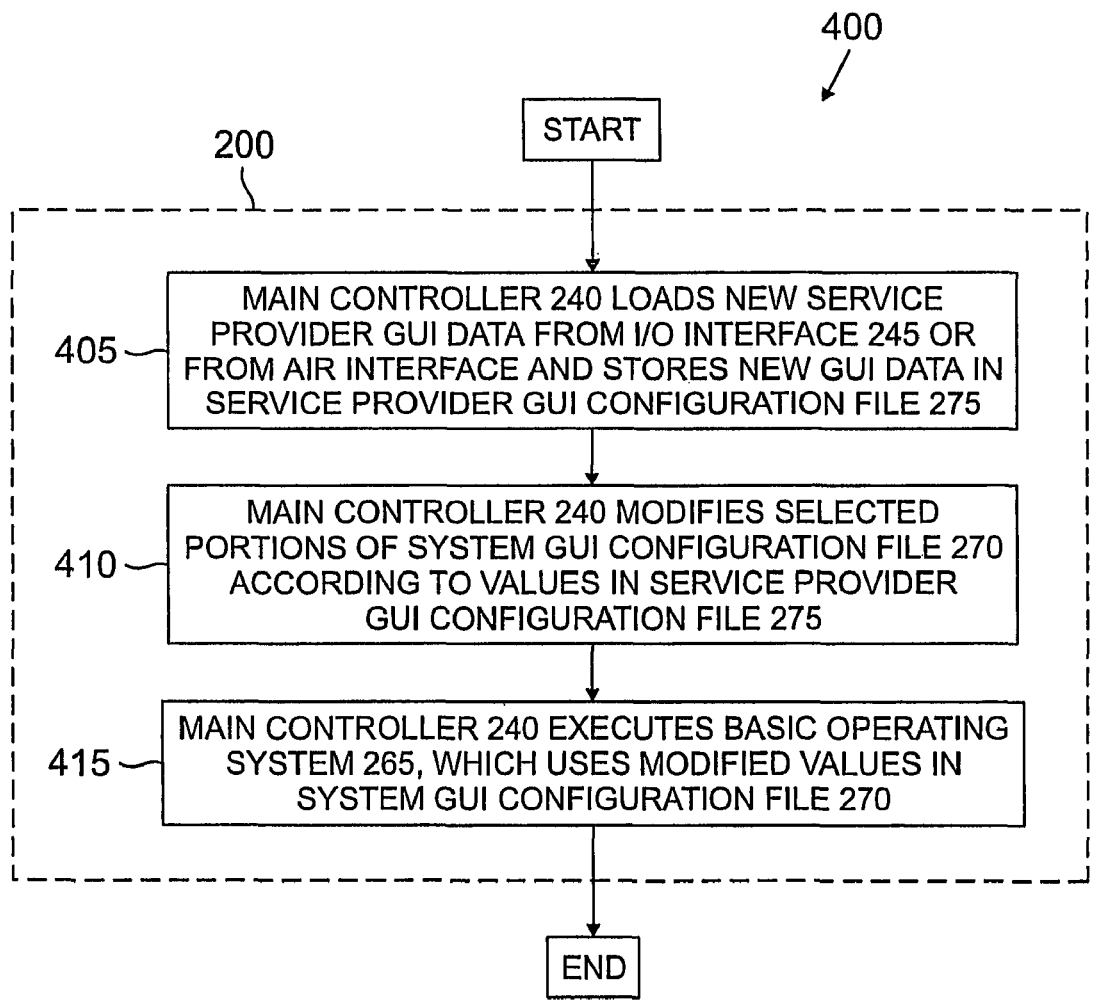
FIG. 4 is a flow diagram illustrating an operation for updating or modifying the graphical user interface of the exemplary mobile station in FIG. 2 according to one embodiment of the present invention.

FIG. 4 depicts flow diagram 400, which illustrates an operation for updating or modifying the graphical user interface of exemplary mobile station 200 according to one embodiment of the present invention. Main controller 240 may receive the service provider's GUI data from I/O interface 245 or from RF transceiver 210 and RX processing circuitry 225 during an over-the-air (OTA) download procedure. Main controller 240 subsequently stores the new GUI data in service provider GUI configuration file 275 (process step 405).

Next, main controller 240 modifies (e.g., replaces) selected portions of system GUI configuration file 270 according to the new customized values in service provider GUI configuration file 275 (process step 410). Main controller 240 executes basic operating system program 265 which uses modified values in system GUI configuration file 270 (process step 415). A this point, the GUI of the handset in the customized one created by the wireless service provider.

Figure 5:
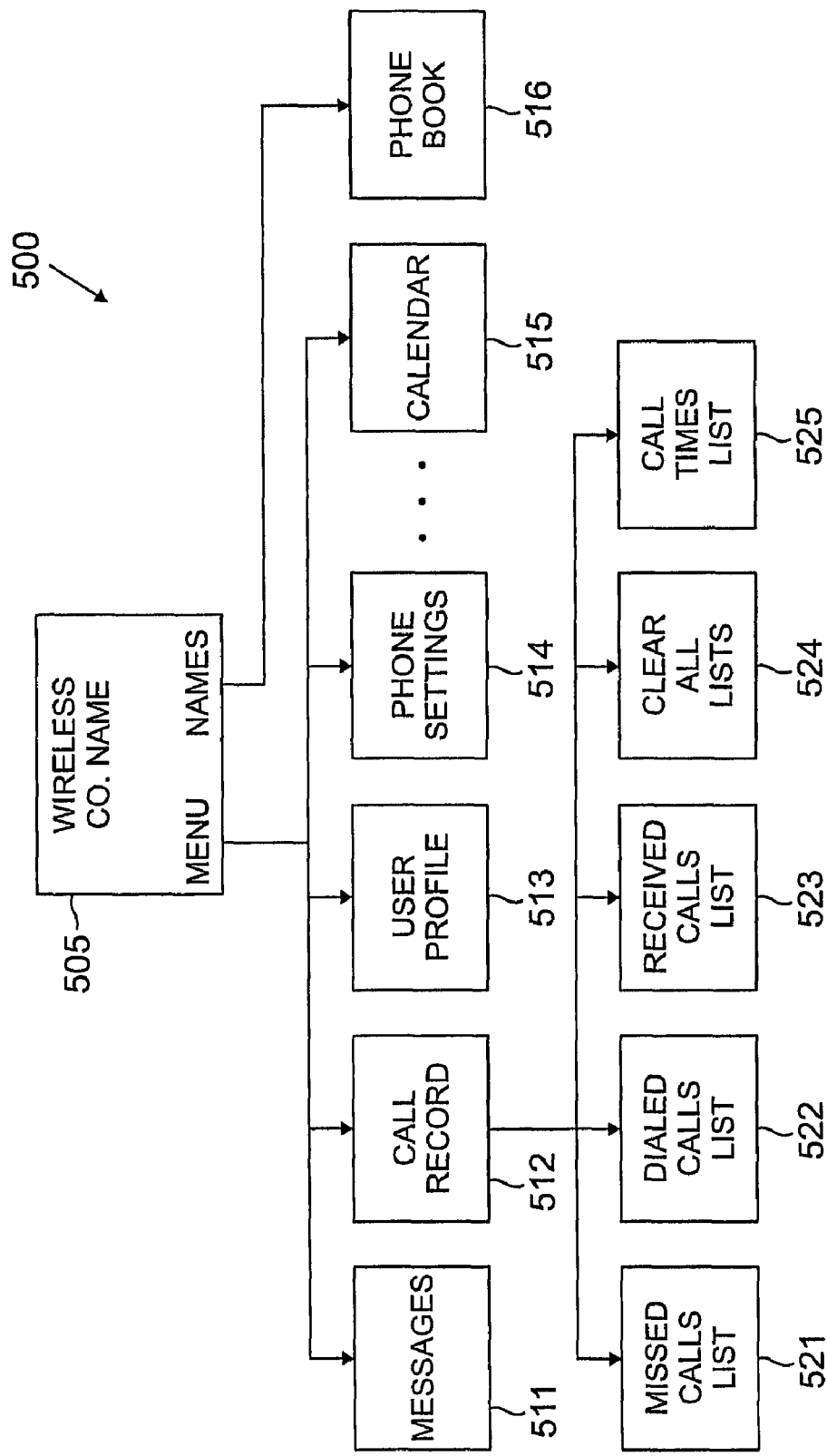
FIG. 5 illustrates a menu hierarchy tree according to a default system GUI configuration file in the exemplary mobile station according to one embodiment of the present invention.

FIG. 5 illustrates three level menu hierarchy tree 500 according to default system GUI configuration file 270 in exemplary mobile station 200 according to one embodiment of the present invention. The structure of hierarchy tree 500 and the branches between screens is determined by the data in menu hierarchy file 305. The content of Main screen 505 is determined by menu options 310 and screen displays 315. In an exemplary embodiment, the name of the wireless service provider (i.e., "Wireless Co. Name") appear in Main screen 505 and the user may select a MENU option or a NAMES option.

If the user selects the NAMES option, basic operating system application 265 displays Phone Book screen 516, from which the user may recall and scroll through a list of name and phone numbers in order to make a phone call. A particular phone number may be selected from Phone Book screen 516 using a selection control key. If the user selects the MENU option from Main screen 505, basic operating system application 265 branches to the first screen of a sequence of screens through which the user may scroll.

In the exemplary embodiment shown in FIG. 5, basic operating system application 265 branches to Messages screen 516. The user may then use the scroll button to move in sequence through Call Record screen 512, User Profile screen 513, Phone Settings screen 514, and others, until Calendar screen 515 is reached. From any of these screens in the second layer of the menu hierarchy, the user may use the select button to initiate a function or operation of mobile station 200. For example, selecting a messages option from Messages screen 511 may cause a sequential display of each stored incoming message. A message may be a text message or a voice message which is stored when the user does not answer an incoming call. If "Voice Mail" is selected from Messages screen 511, mobile station 200 may be access the subscriber's voice mail system to retrieve stored voice mails.

User Profile screen 513 allows the subscriber to sequence through, select and modify information that pertains to mobile station 200 ring status during various conditions such as normal, quiet, and conference. Phone Settings screen 514 displays the subscriber-selected features and general features associated with the operation of mobile station 200. For instance, Phone Settings screen 514 may allow the user to modify the language of display 255, such as English or Spanish, as well as clock settings, alarm enable, keypad audible sounds, ring tones, manufacturer default conditions, and similar characteristics. Calendar screen 515 displays the present calendar day, as well as the ability to enter and delete notes such as meeting schedules associated with past and future calendar dates.

In some instances, selecting a function from a screen may lead to a still lower layer of menus in the menu hierarchy. For example, if the user selects "Call Records" from Call Record screen 512, basic operating system application 265 branches to the first screen of another sequence of screens through which the user may scroll. In the exemplary embodiment shown in FIG. 5, basic operating system application 265 branches to Missed Calls List screen 521. The user may then use the scroll button to move in sequence through Dialed Calls List screen 522, Received Calls List screen 523, Clear All Lists screen 524, and Call Times List screen 525.

From any of these screens in the third layer of the menu hierarchy, the user may use the select button to initiate a function or operation of mobile station 200. For example, selecting a "Missed Calls" option from Missed Calls List screen 521 may display a scrollable list of phone numbers of incoming calls that the user did not answer. Similarly, selecting a "Dialed Calls" option from Dialed Calls List screen 522 may display a scrollable list of the last "N" phone numbers dialed by the user of mobile station 200. Selecting a "Received Calls" option from Received Calls List screen 522 may display a scrollable list of the last "N" phone numbers answered by the user of mobile station 200. Call Times List screen 525 displays the time of the last N calls that the user made or answered. Clear All Lists screen 524 allows the user to select an option that clears the current entries in Dialed Calls List screen 522, Received Calls List screen 523, and Call Times List screen 525.

Figure 6:
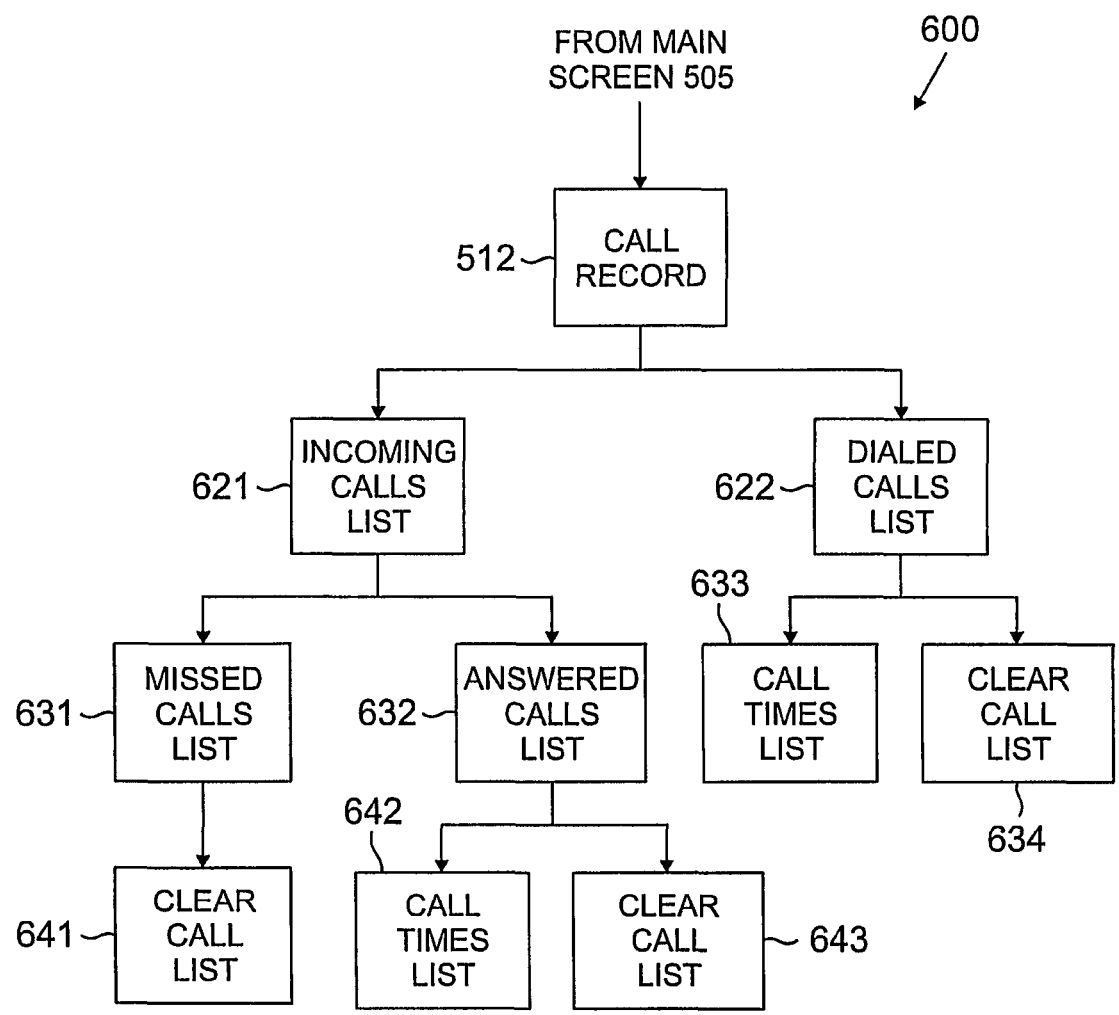
FIG. 6 illustrates a menu hierarchy tree according to a modified version of the system GUI configuration file in the exemplary mobile station according to one embodiment of the present invention.

FIG. 6 illustrates menu hierarchy tree 600 according to a modified version of system GUI configuration file 270 in exemplary mobile station 200 according to one embodiment of the present invention. Menu hierarchy tree 500 has now been partially modified by customized values that basic operating system application 265 retrieved from service provider GUI configuration file 275. In the exemplary embodiment, the wireless service provider associated with mobile station 200 has modified menu hierarchy tree 500 in the third layer below Call Record screen 512, thereby giving mobile station 200 a look-and-feel unique to the wireless service provider.

System GUI configuration file 270 has been changed so that menu hierarchy tree 600 contains five levels rather than the initial three levels of FIG. 5. When the user selects "Call Records" from Call Record screen 512, basic operating system application 265 branches to the first screen of two screens through which the user may scroll. In the exemplary embodiment shown in FIG. 6, basic operating system application 265 branches to Incoming Calls List screen 621. The user may then use the scroll button to move to Dialed Calls List screen 622.

From Incoming Calls List screen 621, the user may select a "Missed Calls" option that displays Missed Calls List screen 631 that contains a scrollable list of phone numbers of the last "N" calls missed by the user. Missed Calls List screen 631 can access Clear Call List screen 641 which contains an option that allows the user to clear the Missed Calls list.

From Incoming Calls List screen 621, the user also may select an "Answered Calls" option that displays Answered Calls List screen 632 that contains a scrollable list of phone numbers of the last "N" calls answered by the user. Answered Calls List screen 632 can access Call Times List screen 642 and Clear Call List screen 643 which contains an option that allows the user to clear the Answered Calls list.

From Dialed Calls List screen 622, the user may select a "Calls Times" option that displays Call Time List screen 633 that contains a scrollable list of phone numbers of the last "N" calls made by the user. The user also may select a "Clear Call List" option that allows the user to clear the Dialed Calls list.

As can be seen from this description, exemplary system GUI configuration file 270 and service provider GUI configuration file 275, in conjunction with basic operating system program 265 provide the capability for separating general operating capabilities of mobile station 200 from specific manufacturer and service provider activation of these operating capabilities. Thus, devices with the capability of mobile station 200 may be manufactured and then re-configured according to the needs of a specific wireless service provider without requiring extensive recompiling and testing of software.

As noted above, system GUI configuration file 270 and service provider GUI configuration file 275 each contain a text name checksum value that is calculated using the text names of the GUI parameter data stored in system GUI configuration file 270 and service provider GUI configuration file 275. During the initial load of source code software and system GUI configuration file 270 onto mobile station 200, a resource compiler processes GUI parameter data (i.e., input resources) and the textual names associated with those input resources. The resource compiler also maintains a running checksum value of the textual names. The final checksum value is stored in system GUI configuration file 270 as initial text name checksum value 340. During a subsequent download of a new service provider GUI configuration file 275 onto mobile station 200, the mobile station handset compares downloaded text name checksum value 390 to initial text name checksum value 340. If the two text name checksum values do not match, the mobile station handset rejects service provider GUI configuration file 275.

Figure 7:
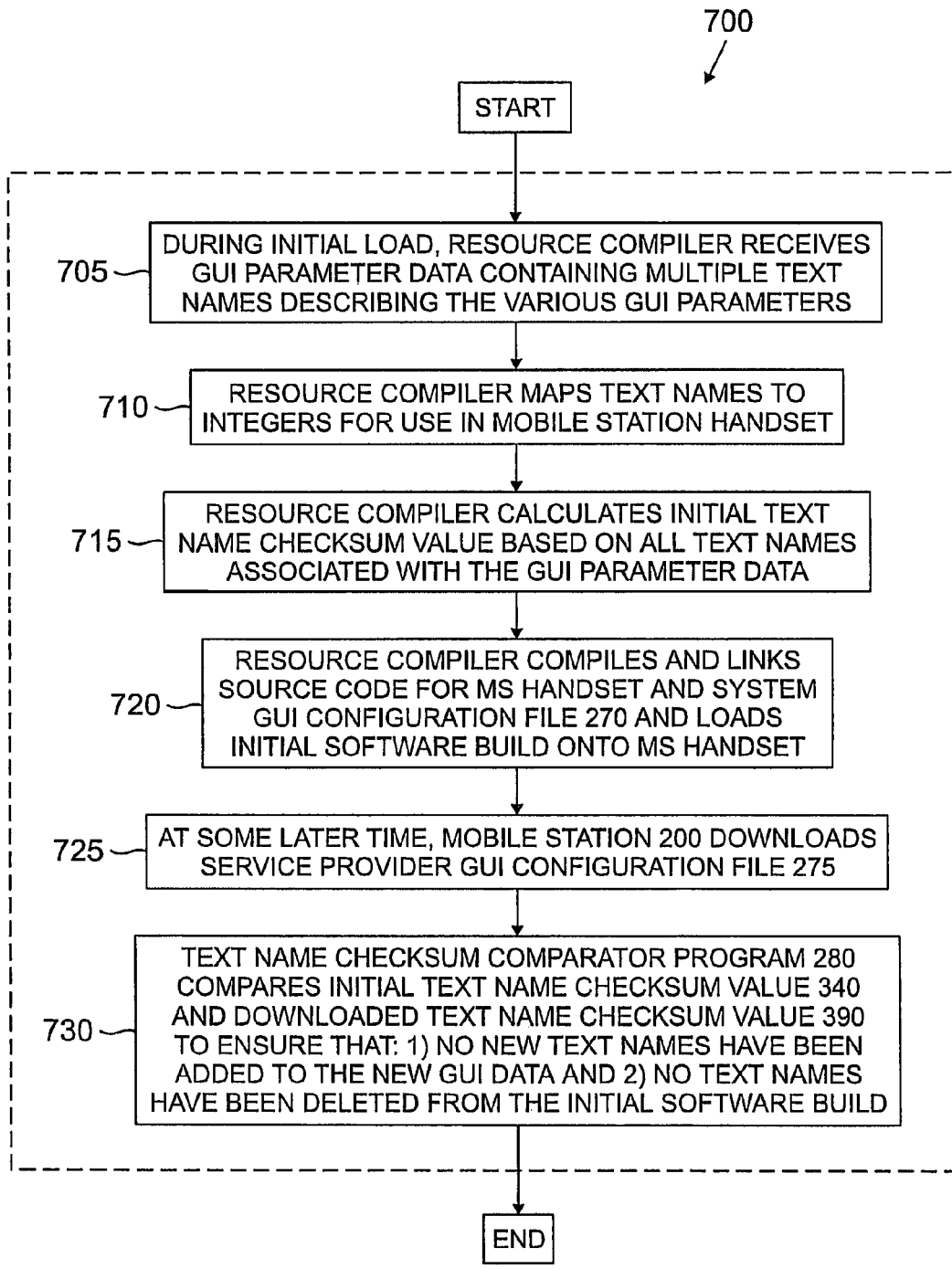
FIG. 7 is a flow diagram illustrating the verification of downloaded GUI data by comparing a checksum data value from an initial software load operation and a checksum value from the downloaded GUI operation according to an exemplary embodiment of the present invention.

FIG. 7 is a flow diagram illustrating the verification of downloaded GUI data by comparing a checksum data value from an initial software load operation and a checksum value from the downloaded GUI operation according to an exemplary embodiment of the present invention. During the initial load (or initial build), a resource compiler used by the mobile station manufacturer receives GUI parameter data containing multiple text names describing the various GUI parameters (process step 705). The resource compiler maps the text names to integers for use in mobile station handset (process step 710). The resource compiler also calculates an initial text name checksum value based on all the text names associated with the GUI parameter data (process step 715). The resource compiler then compiles and links the source code for the mobile station (MS) handset and system GUI configuration file 270. The initial software build is then loaded onto mobile station 200 (process step 720). At some later time, mobile station 200 downloads service provider GUI configuration file 275 (process step 725). Text name checksum algorithm program 280 compares initial text name checksum value 340 and downloaded text name checksum value 390 to ensure that: 1) no new text names have been added to the new GUI data and 2) no text names have been deleted from the initial software build (process step 730).

Although the present invention has been described in detail, those skilled in the art should understand that they can make various changes, substitutions and alterations herein without departing from the spirit and scope of the invention in its broadest form.

What is claimed is:

1. A wireless communication device comprising:
    a main controller capable of executing a basic operating system application program that operates communication functions of said wireless communication device and that controls a first graphical user interface (GUI) for interacting with a user;
    a memory, within the wireless communication device, coupled to said main controller, capable of storing a first GUI configuration file and a second GUI configuration file; wherein
    said first GUI configuration file contains first GUI parameter data comprising
        a first plurality of text names and,
        a corresponding plurality of parameter data items comprising at least one of: sounds, graphical images, text, menu options and a menu hierarchy associated with said first graphical user interface, and
        a first text name checksum value calculated from only said first plurality of text names, and
    said second GUI configuration file contains second GUI parameter data comprising
        a second plurality of text names and,
        a corresponding plurality of parameter data items comprising at least one of: sounds, graphical images, text, menu options and a menu hierarchy associated with a second graphical user interface, and
        a second text name checksum value calculated from only said second plurality of text names; and wherein said main controller is operable to validate said second GUI parameter data by comparing said first text name checksum value contained in said first GUI configuration file with said second text name checksum value contained in said second GUI configuration file, and wherein each of said text names in said first and second pluralities of text names describes said corresponding parameter data item in said corresponding pluralities of parameter data items.

2. The wireless communication device as set forth in claim 1 wherein said main controller is operable to replace at least a portion of said first GUI parameter data with said second GUI parameter data in response to a determination that said first and second text name checksum values are equal.

3. The wireless communication device as set forth in claim 2 wherein said first GUI configuration file is a system default GUI configuration file.

4. The wireless communication device as set forth in claim 2 wherein said wireless communication device is a cellular telephone handset.

5. The wireless communication device as set forth in claim 2 wherein said wireless communication device is a personal digital assistant (PDA) device.

6. The wireless communication device as set forth in claim 2 wherein said second GUI configuration file is a service provider GUI configuration file.

7. The wireless communication device as set forth in claim 6 wherein said main controller is operable to download said second GUI configuration file to the wireless communication device.

8. The wireless communication device as set forth in claim 7 wherein said main controller is operable to download said second GUI configuration file via an over-the-air connection.

9. The wireless communication device as set forth in claim 7 wherein said main controller is operable to download said second GUI configuration file via a wired connection.

10. The wireless communication device as set forth in claim 2 wherein said main controller is operable to control said first GUI according to said first GUI parameter data.

11. For use in a wireless communication device comprising a main controller that controls a first graphical user interface (GUI) for interacting with a user, a method of validating data associated with a second graphical user interface comprising the steps of:

retrieving a first text name checksum value stored in a first GUI configuration file in a memory in the wireless communication device, the first GUI configuration file containing first GUI parameter data comprising a first plurality of text names and a corresponding plurality of parameter data items comprising at least one of: sounds, graphical images, text, menu options and a menu hierarchy associated with the first graphical user interface, wherein the first text name checksum value is calculated using only the first plurality of text names;

retrieving a second text name checksum value stored in a second GUI configuration file in the memory, the second GUI configuration file containing second GUI parameter data comprising a second plurality of text names and a corresponding plurality of parameter data items comprising at least one of: sounds, graphical images, text, menu options and a menu hierarchy associated with a second graphical user interface, wherein the second text name checksum value is calculated using only the second plurality of text names; and comparing the first text name checksum value with the second text name checksum value, wherein each of said text names in said first and second pluralities of text names describes said corresponding parameter data item in said corresponding pluralities of parameter data items.

12. The method as set forth in claim 11 further comprising the step of replacing at least a portion of the first GUI parameter data with the second GUI parameter data in response to a determination that the first and second text name checksum values are equal.

13. The method as set forth in claim 12 wherein the first GUI configuration file is a system default GUI configuration file.

14. The method as set forth in claim 12 wherein the wireless communication device is a cellular telephone handset.

15. The method as set forth in claim 12 wherein the wireless communication device is a personal digital assistant (PDA) device.

16. The method as set forth in claim 12 wherein the second GUI configuration file is a service provider GUI configuration file.

17. The method as set forth in claim 16 further comprising the step of downloading the second GUI configuration file to the wireless communication device.

18. The method as set forth in claim 17 further comprising the step of downloading the second GUI configuration file via an over-the-air connection.

19. The method as set forth in claim 17 further comprising the step of downloading the second GUI configuration file via a wired connection.

20. The method as set forth in claim 12 further comprising the step of controlling the first GUI according to the first GUI parameter data.

* * * * *